(12) United States Patent
Kirn et al.

(10) Patent No.: US 6,375,125 B1
(45) Date of Patent: Apr. 23, 2002

(54) HYBRID COMPOSITES FOR OXYGEN PROPULSION SYSTEMS

(75) Inventors: Elizabeth P. Kirn, Fort Worth, TX (US); Neil Anthony Graf, River Ridge, LA (US); Kevin Wilbur Ely, Huntsville, AL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/309,805

(22) Filed: May 11, 1999

Related U.S. Application Data (60) Provisional application No. 60/084,986, filed on May 11, 1998, provisional application No. 60/084,987, filed on May 11, 1998, provisional application No. 60/084,988, filed on May 11, 1998, provisional application No. 60/084,989, filed on May 11, 1998, provisional application No. 60/084,990, filed on May 11, 1998, provisional application No. 60/084,991, filed on May 11, 1998, and provisional application No. 60/084,992, filed on May 11, 1998.

(51) Int. Cl.$^7$ .................................................. B64G 1/22
(52) U.S. Cl. ........................... 244/158 R; 244/135 R; 244/36; 244/160
(58) Field of Search ............................ 244/158 R, 172, 244/135 R, 36, 160; 220/919, 456; 528/357; 521/56; 428/297.4; 156/181

(56) References Cited

U.S. PATENT DOCUMENTS

| | | | | |
|---|---|---|---|---|
| 3,261,571 A | * | 7/1966 | Pinnes | 244/172 |
| 3,938,346 A | * | 2/1976 | Ovchinnikov et al. | 220/91 G |
| 4,919,739 A | * | 4/1990 | Dyksterhouse et al. | 156/181 |
| 5,150,812 A | * | 9/1992 | Adams | 220/456 |
| 5,175,241 A | * | 12/1992 | Darrow | 528/353 |
| 5,380,768 A | | 1/1995 | Cranston et al. | 521/167 |
| 5,403,537 A | | 4/1995 | Seal et al. | 264/511 |
| 5,419,139 A | | 5/1995 | Blum et al. | 62/45.1 |
| 5,901,557 A | * | 5/1999 | Grayson | 62/50.1 |
| 5,994,418 A | * | 11/1999 | Weiser et al. | 521/56 |
| 6,013,361 A | * | 1/2000 | Seal et al. | 428/297.4 |

FOREIGN PATENT DOCUMENTS

| | | |
|---|---|---|
| WO | WO97/28401 | 8/1997 |
| WO | WO97/18081 | 5/1998 |

* cited by examiner

*Primary Examiner*—Galen L. Barefoot
(74) *Attorney, Agent, or Firm*—Garvey, Smith, Nehrbass & Doody, LLC (57) ABSTRACT

The development of polymer composite liquid oxygen (LOX) tanks is a critical step in creating the next generation of launch vehicles. A composite LOX tank will weigh significantly less than conventional metal tanks. This benefit of reduced weight is critical to enable future launch vehicles to meet required mass ractions. The high strength and low weight of a composite tank allows for a lighter weight craft and/or higher payload capacity which results in lower costs per pound to place an object in orbit. The unique, nontraditional idea described here is to use resin-based composite materials to make such a composite tank or other oxygen carrying component such as a feedline. Polymer composites have traditionally been regarded as being more flammable than metals and therefore deemed not oxygen compatible. However, a hybrid composite material may provide the optimal balance of oxygen compatibility and mechanical performance that would make composite oxygen tanks feasible.

33 Claims, 6 Drawing Sheets

HYBRID COMPOSITES FOR OXYGEN PROPULSION SYSTEMS

CROSS-REFERENCE TO RELATED APPLICATIONS

U.S. Provisional Patent Application Ser. Nos. 60/084,986; 60/084,987; 60/084,988; 60/084,989; 60/084,990; 60/084,991; 60/084,992; all filed May 11, 1998, are incorporated herein by reference; priority of these applications is hereby claimed.

STATEMENT REGARDING FEDERALLY SPONSORED RESEARCH OR DEVELOPMENT

The inventions described herein were made in the performance of work under Lockheed Martin Michoud Space Systems IRAD M-21D and under Cooperative Agreement No. NCC8-115 dated Jul. 1, 1996.

REFERENCE TO A "MICROFICHE APPENDIX"

Not applicable

BACKGROUND OF THE INVENTION

1. Field of the Invention

This invention relates in general to liquid oxygen tanks and feed lines of composite material construction, and more specifically to oxygen tanks and feed lines of hybrid composites construction.

2. General Background

Figure 1:
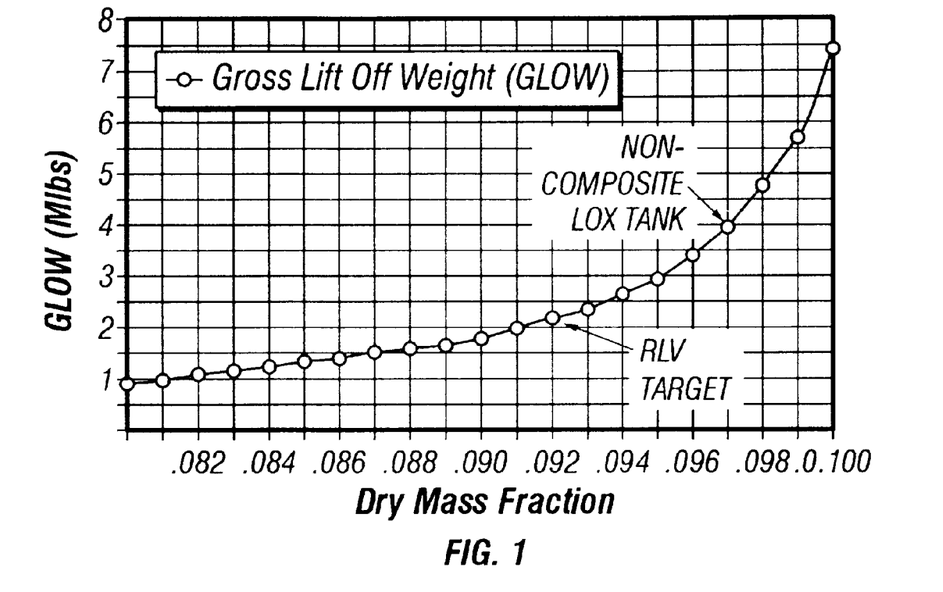
FIG. 1 is a graphical representation of the effect of mass fraction on gross lift off weight.

The development of polymer composite liquid oxygen tanks is a critical step in creating the next generation of launch vehicles. Future reusable launch vehicles need to minimize the gross liftoff weight (GLOW) by reducing the dry mass fraction. The (dry) mass fraction is the weight of the launch vehicle without fuel divided by the weight of the vehicle with fuel. FIG. 1 is graph showing the effect of mass fraction on GLOW. Indicated on the graph are the RLV mass fraction target region as well as the mass fraction of the RLV without the weight reduction that composites could provide. It is clear that composite tanks are critical to enable future launch vehicles to meet required mass fractions.

Figure 2:
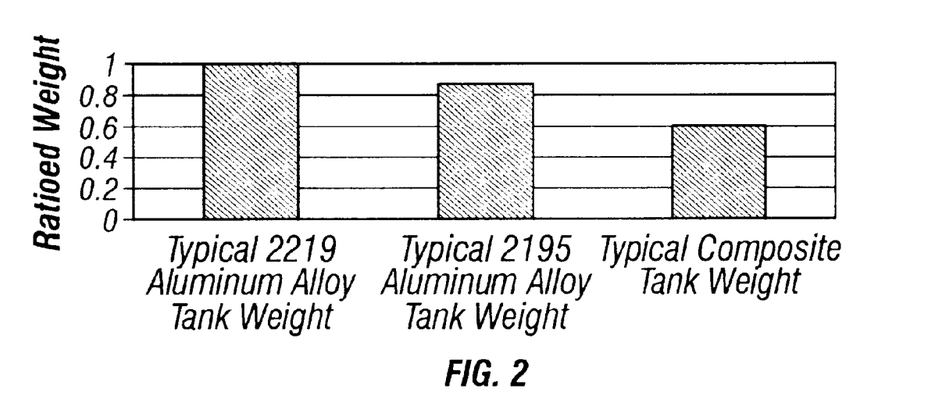
FIG. 2 is a graphical representation of material weight comparison.

The required mass fraction is possible due to the reduction of weight that composite materials can provide. Traditional oxygen tanks are usually made from metals. The space shuttle external tank (ET) has historically been made from 2219 aluminum and more recently 2195 aluminum/lithium alloy. FIG. 2 shows a comparison between these two aluminum alloys and a typical composite material for a liquid oxygen tank for a launch vehicle. The chart shows that a composite tank provides up to 41% and 28% weight savings when compared to 2219 and 2195 aluminum alloy tanks, respectively.

Although a composite liquid oxygen, (LOX) tank makes the RLV mass fraction feasible, a liquid oxygen tank must be compatible with oxygen. The ASTM definition for oxygen compatibility is the "ability of a substance to coexist with both oxygen and a potential source(s) of ignition within the acceptable risk parameter of the user." It is imperative that materials are selected that will resist any type of detrimental, combustible reaction when exposed to usage environments. Typically, non-metallic materials are not used in these applications because most are easily ignited in the presence of oxygen. However, there are some polymeric materials with inert chemistries that may be used for this application and resist ignition. These chemistries were evaluated by fabricating coupons and testing them with various ignition mechanisms in the presence of liquid and gaseous oxygen. The testing performed reflected situations in launch vehicles that could be potential sources of ignition in composite. These tests included modified ambient pressure mechanical impact, pressurized mechanical impact, puncture, puncture of damaged, oxygen-soaked samples, friction, and pyrotechnic shock.

Some composite materials that have excellent resistance to ignition may not have the mechanical or physical properties required to make a feasible composite tank. Similarly, composite materials which have excellent mechanical and physical properties may not be resistant to ignition in the presence of oxygen. Therefore, a hybrid composite may be an ideal solution. A hybrid composite tank would have inner plies of an oxygen compatible composite, while the outer plies of the tank would be made from materials with better structural properties.

Applications for hybrid tanks include liquid oxygen tanks for future launch vehicles, such as the Lockheed Martin Reusable Launch Vehicle (RLV). They could also potentially be used in other aerospace applications, including but not limited to, RFP (rocket fuel propellant) tanks and crew vehicle cabins. Other industries that may be interested in composite oxygen tanks include the air handling and medical industries. The ability to resist ignition may also be useful in chemical storage tanks and NGV (natural gas vehicle) tanks.

The following U.S. Patents are incorporated herein by reference: U.S. Pat. Nos. 5,056,367; 5,251,487; 5,380,768; 5,403,537; 5,419,139; and all references cited in those patents.

The following international applications published under the PCT are incorporated herein by reference: International Publication Nos. WO 97/18081 and WO 97/28401 and all references cited in those publications.

SUMMARY OF INVENTION

A fiber-reinforced composite is defined as a material consisting of fibers of high strength and modulus embedded in or bonded to a matrix with distinct interfaces or boundaries between them. In this form, both fibers and matrix retain their physical and chemical identities, yet they produce a combination of properties that cannot be produced by either constituent alone. In general, fibers are the principal load carrying members, while the surrounding matrix keeps them in desired location and orientation, transfers loads between fibers, and protects the fibers. The matrix material may be a polymer, a metal, or a ceramic. This patent focuses on polymer matrix composites.

The fibers can be made from a variety of materials. These materials include glass, graphite or carbon, polymers, boron, ceramics, or metals. Glass fibers include E-glass (electrical) and S-glass (structural) types. Carbon fibers include those made from different precursors, such as polyacrylonitrile (PAN) or pitch. Polymer fibers include, but are not limited to, aramid (Kevlar®), polyethylene (Spectra®), or PBO (Zylon®). Ceramic fibers may include silicon carbide (SiC) or aluminum oxide (Al2O3).

For cryogenic tanks, the preferred most material is a polymer. The preferred lower is carbon fiber, more preferably PAN-based fibers, more preferably high strength (over 500 ksi) and high modulus (over 30 Msi) fibers. The most preferred fibers are ultra high modulus fibers (over 60 Msi), specifically M55J fiber by Toray.

Another critical parameter for a composite tank is the ability to withstand repeated temperature changes (thermal cycles) without microcracking. One factor that contributes to microcrack resistance is toughness.

The unique, nontraditional concept explored herein is to use hybrid composites to create liquid oxygen tanks. A hybrid composite would allow for oxygen compatible inner layers while have outer layers of a different composite to provide the necessary mechanical properties.

Historically, the approach used to determine the oxygen compatibility of a material was to test the material in the standard mechanical impact test in liquid oxygen (LOX). If the material had an impact threshold of 72 foot-pounds, it was acceptable for use in oxygen environments, such as launch vehicle LOX tanks. If the material's threshold was less than 72 foot-pounds, it typically was not used. Due to limitations in the testing as well as differences in the material structures between metals and composites, standard high strength graphite reinforced composites typically have not been able to pass at this level when tested at RLV tank wall thicknesses. The approach taken here, which was developed in conjunction with NASA, was to use the standard mechanical impact test to rank composites with respect to each other. Furthermore, an evaluation of the compatibility of composites in oxygen environments would only be determined after testing composite materials with respect to specific ignition mechanisms while in the presence of oxygen. The ignition mechanisms tested included pressurized mechanical impact, particle impact, puncture, puncture of damaged, oxygen-soaked samples, electrostatic discharge, friction, and pyrotechnic shock. If the material could withstand ignition in these environments, it could possibly be considered oxygen compatible.

Oxygen compatibility addresses only one aspect of an oxygen tank for future launch vehicles. The liquid oxygen tank in the Lockheed Martin Michoud Space Systems' RLV, for example, is the structural backbone for the vehicle. As a result, a composite used for the tank must have outstanding mechanical properties. Unfortunately, the composites with the best structural performance may not necessarily be the composite with the best resistance to ignition, and vice-versa. For example, graphite-reinforced composites provide the best structural performance for a composite tank. However, a composite with an alternate reinforcement, such as glass or Kevlar®, may provide improved oxygen compatibility performance over graphite reinforced composites. Unfortunately, these alternate reinforcements do not provide the high strength-to-weight or strain-to-weight ratios and other structural benefits offered by graphite reinforced composites. Therefore, it is believed that a hybrid material consisting of two different composite systems may provide the optimal mechanical properties and oxygen compatibility. The inner layers of the component, which is in contact with the liquid oxygen, would be made from the more compatible system, while the outer layers of the component would be made from the higher performance system.

The apparatus of the present invention solves the problems confronted in the art in a simple and straightforward manner. What is provided are composite tanks for liquid oxygen.

The composite tanks can be made in accordance with any of the methods disclosed in any reference incorporated herein by reference. The invention could be made, for example, using the method of U.S. Pat. No. 5,403,537.

The interior of the tanks disclosed herein typically have a volume of at least lower, more often at least one gallon, and usually have a volume sufficient to allow their use to contain liquid oxygen for typical aerospace applications.

A mechanical impact of at least 10+ ft-lbs at around −300 degrees F. (at around −350 degrees F. when densified oxygen (slush oxygen) is contained in the tank) is preferred, but is not a requirement. Historically materials have been required to pass the Lox mechanical impact test at 72 ft-lbs or otherwise be shown to be safe for use in application. Lox compatible composite materials have demonstrated the ability to resist combustion when subjected to any potential ignition source. For a composite tank, realistic potential ignition sources were determined to include, but are not limited to mechanisms such as pyrotechnic shock, friction, puncture, electrostatic discharge, and particle impact. These tests are taken to extreme levels. For example, in the puncture test, a sharpened serrated spike pierced a composite material while submerged in Lox without igniting the composite. This same puncture test has ignited Titanium, a material that is not oxygen compatible, and does not ignite aluminum. The pyrotechnic shock test was also an extreme test in that composites were placed in Lox and subjected to shock loads equivalent to existing metallic Lox tanks such as that on the External Tank. The friction test was extreme in that the composites were abraded to dust with a drill bit in pure oxygen without ignition. In the electrostatic discharge test, composites were subjected to energies that could far exceed any instrumentation or static build up; specifically, these composites do not ignite when subjected to 112.5 Joules from 5000 Volts.

The composite feedline of the present invention preferably has an inner diameter of around 1" to 36".

As used herein, "form of fiber" means uni-directional tape, slit tape, tow, fabric, woven fabric, chopped fiber, or felt.

BRIEF DESCRIPTION OF THE SEVERAL VIEWS OF THE DRAWINGS

For a further understanding of the nature, objects, and advantages of the present invention, reference should be had to the following detailed description, read in conjunction with the drawings, wherein time is in seconds and mechanical impact is in foot-pounds.

DETAILED DESCRIPTION

Figure 6:
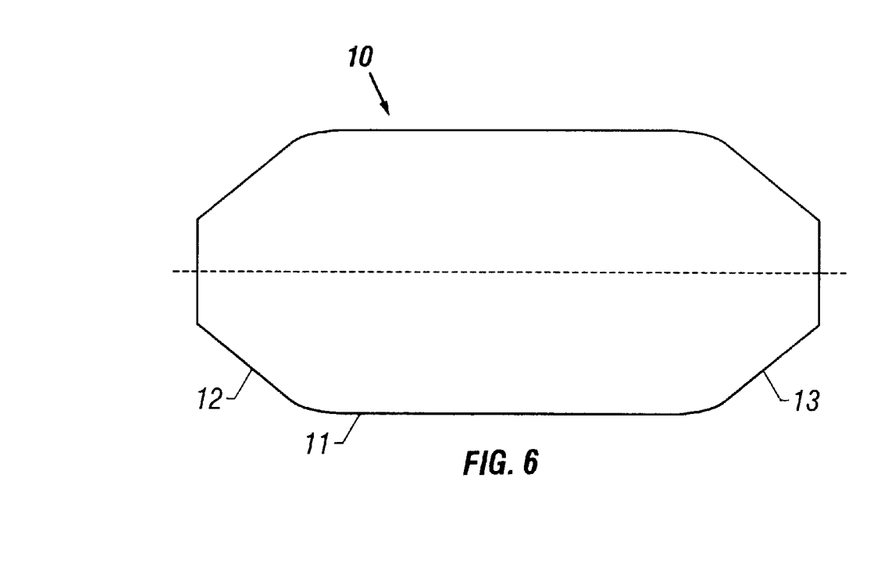
FIG. 6 is a side view of the preferred embodiment of the apparatus of the present invention shown in a cylindrical tank general configuration.
Figure 7:
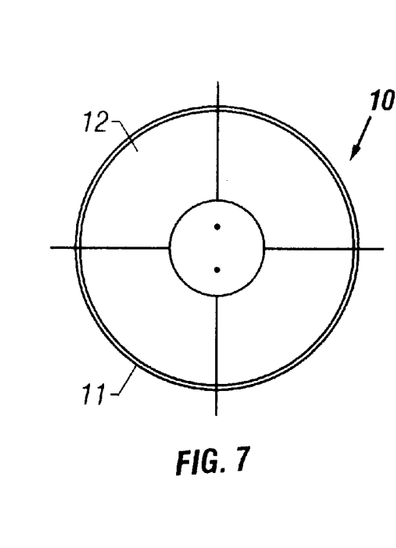
FIG. 7 is an end view of the preferred embodiment of the apparatus of the present invention shown in a cylindrical tank general configuration.

FIGS. 6–7 show the preferred embodiment of the apparatus of the present invention designated generally by the numeral 10. The shape of a composite LO2 tank is not limited to, but may be any of the following: cylindrical, spherical, ogived, multi-lobe, or conformal. Composite LO2 tanks may be part of but are not limited to any of the following launch vehicles types: lifting body or winged body. A composite tank may also be part of a separate stage such as the External tank of the spare shuttle.

Figure 8:
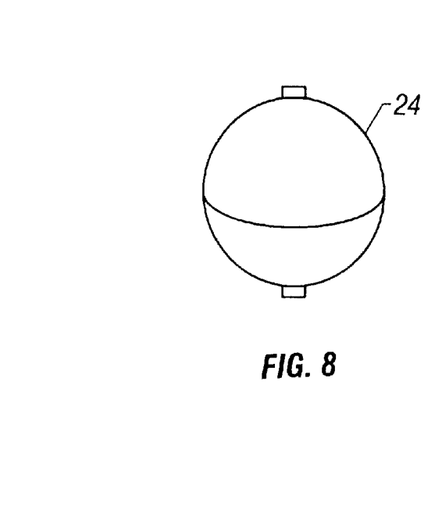
FIG. 8 is a perspective view of the preferred embodiment of the apparatus of the present invention showing a spherical tank.

A spherical tank 24 is simply a sphere as shown in FIG. 8. Tank 24 can have a diameter of between about 1–150 feet.

Figure 9:
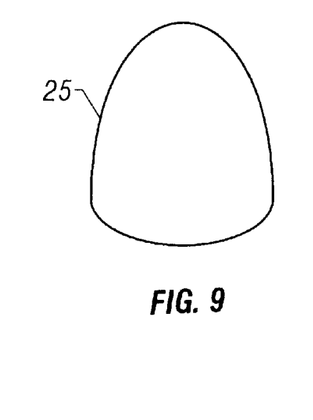
FIG. 9 is a perspective view of the preferred embodiment of the apparatus of the present invention showing an ogived tank.

An ogived tank 25 is a tank with an ogive shape along its sides. The sides can measure between about 1 and 150 feet wide or about 3 and 150 feet high. An example of an ogive tank 25 is the external tank LO2 tank. FIG. 9 depicts a sketch of this concept.

Figure 16:
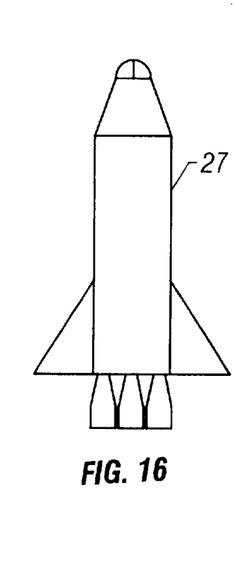
FIG. 16 is a perspective of the preferred embodiment of the apparatus of the present invention showing a winged body.
Figure 17:
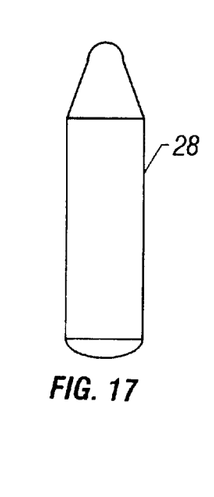
FIG. 17 is a perspective of the preferred embodiment of the apparatus of the present invention showing a cylindrical stage, external tank type.

Any of the tanks of FIGS. 6–14 may be part of a winged body vehicle 27 or a cylindrical stage 28 as shown in FIGS. 16 and 17, respectively. Winged body vehicles 27 can be generally cylindrically shaped, with wings on the sides.

A composite LO2 may be part of a single stage to orbit vehicle or a multiple stage to orbit vehicle where a multiple stage to orbit vehicle is composed of at least 2 stages.

Figure 10:
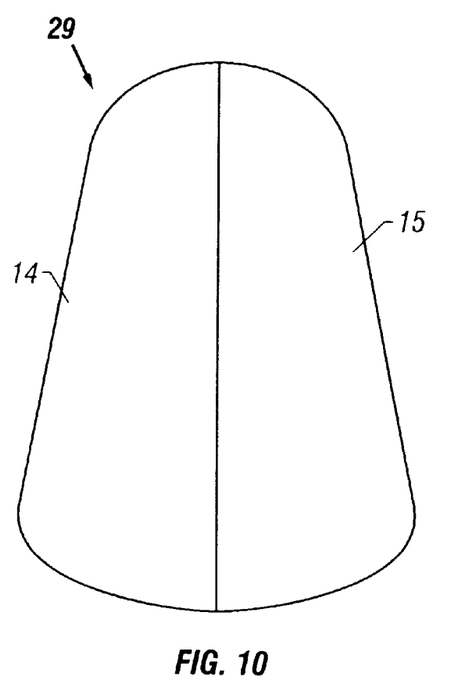
FIG. 10 is a plan view of the preferred embodiment of the apparatus of the present invention showing a multi-lobe tank, general configuration.
Figure 11:
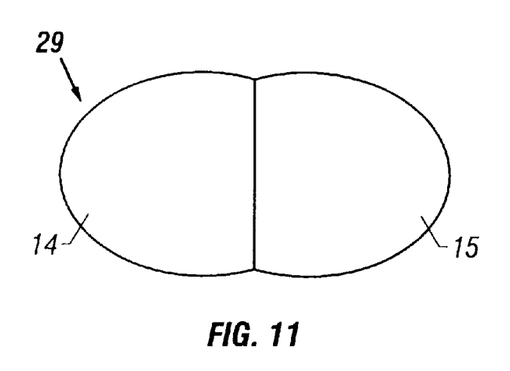
FIG. 11 is an end view of the tank of FIG. 10.

A cylindrical tank is one that has a basic body as a cylinder 11 as shown in FIGS. 6–7. Domes 12, 13 may be facing outward as shown in FIG. 10, but may also be internal or flat bulkheads capping off a cylinder. In FIGS. 10 and 11, a cylindrical tank 10 is shown having a general configuration that includes a cylindrically shaped side wall 11 and conically shaped dome end portions 12, 13.

Figure 12:
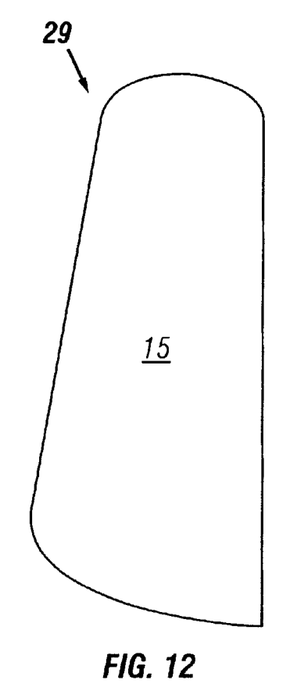
FIG. 12 is a side view of the tank of FIGS. 10 and 11.

In FIGS. 10–12, the tank apparatus 10 is shown in a multi-lobe tank configuration. A multi-lobe tank 29 will have at least 2 lobes as shown in FIGS. 10–12. A multi-lobe tank may also have more than 2 lobes, but typically no more than 5 lobes. A multi-lobe Lox tank 29 may have one lobe with Lox and the other lobe or lobes may contain other propellants such as LH2. In FIGS. 10–12, two tank lobes 14, 15 are shown. However, it should be understood that though there are a minimum of two lobes in FIGS. 12–14, there may be more lobes for forming tank 10.

Figure 13:
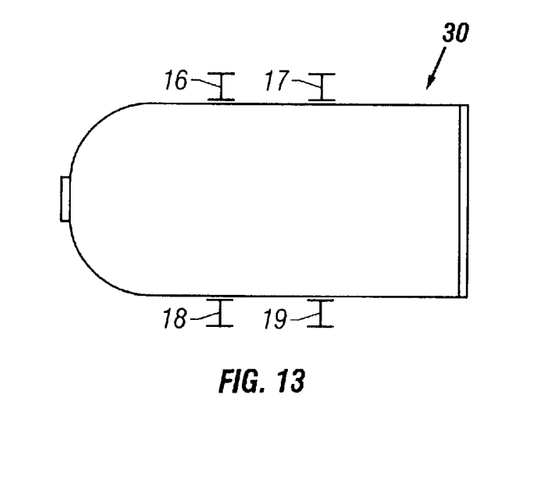
FIG. 13 is a side view of the preferred embodiment of the apparatus of the present invention showing a semi-conformal tank, general configuration.
Figure 14:
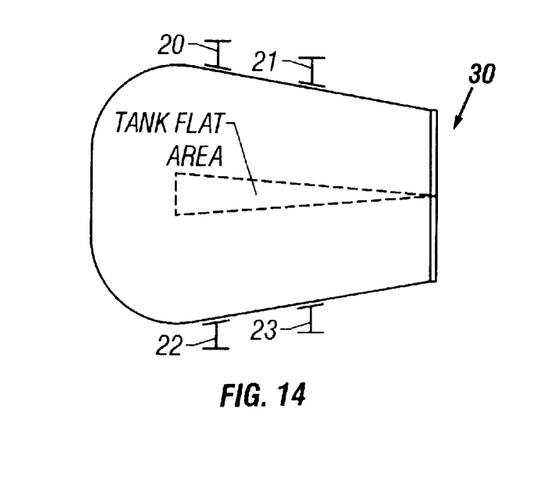
FIG. 14 is a plan view of the tank of FIG. 13.

In FIGS. 13 and 14, a conformal tank 30 is shown mounted between beams including an upper pair of beams 16, 17 and a lower pair of beams 18, 19. Similarly, the tank 10 in FIGS. 13 and 14 can be braced with additional vertically extending beams 20–23. Each of the tanks 10, 24, 25, 29, 30 can have a length of, for example, 2–150 feet and a maximum transverse dimension of between 2 and 100 feet.

In FIGS. 6 and 7, the cylindrically shaped tank provides a diameter of about 1–100 feet and an overall length of about 2–150 feet. The multi-lobe tank 29 of FIGS. 10–12 provides an overall length of between about 4 and 150 feet, a width of 3–100 feet and a height of 2–100 feet.

Figure 15:
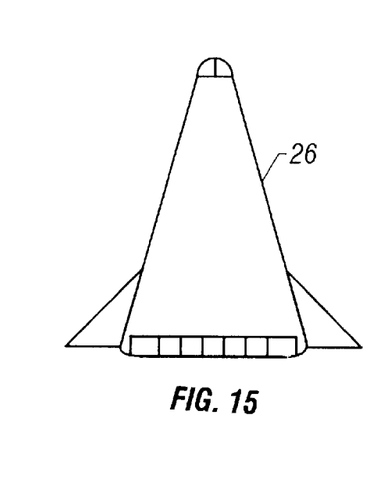
FIG. 15 is a perspective of the preferred embodiment of the apparatus of the present invention showing a lifting body.

A conformal tank 30 is any tank which aims to conform or shape itself to the vehicle inner mold line. Therefore, the shape of a conformal tank 30 will depend upon the vehicle body shape. FIGS. 13–14 show an example of a conformal tank for a lifting body type launch vehicle 26. A lifting body type vehicle 26 is depicted in FIG. 15. The conformal tank 30 of FIGS. 13 and 14 provides an overall length of between about 4 and 150 feet, a width of between 3 and 100 feet, and a height of between about 2–50 feet.

In the detailed descriptions outlined below a component may be either a tank or feedline.

A) Description of Hybrid Component

A hybrid component consists of at least two reinforced composite material systems. These two material systems are referred to the primary component wall system or layer and the interior component wall system or layer. These two layers are in intimate contact with each other forming one hybrid material system. The primary component wall system would consist of a graphite reinforced composite. The interior component wall system is a reinforced composite which may be classified in one of the following manners.

First, the fiber reinforcement of the interior system may be different than that of the primary system in one or more ways. The resin system would be the same for both material systems. One difference could be the type of reinforcement used. The primary system's reinforcement would be perhaps a high strength, intermediate modulus graphite, such as IM7, while the interior system may be reinforced with glass, Kevlar®, Nomex®, or another type of graphite. Another reinforcement difference could be the style of reinforcement. The primary system would likely be continuous unidirectional fiber or fabric. The interior system may be reinforced with continuous fiber, fabric (potentially different weave pattern) or chopped or milled fibers.

The second possibility is that the reinforcement used in both component wall systems would be identical, but the resin in each system would be different in one or more ways. One resin difference could be that the resin in the interior system could have a different chemical composition from the primary system. Another resin difference could be that the resin content of the interior layers may be different than that of the primary layers. It has been demonstrated that composites with resin enriched surfaces (higher resin content) have improved oxygen compatibility characteristics (see FIG. 3).

Figure 3:
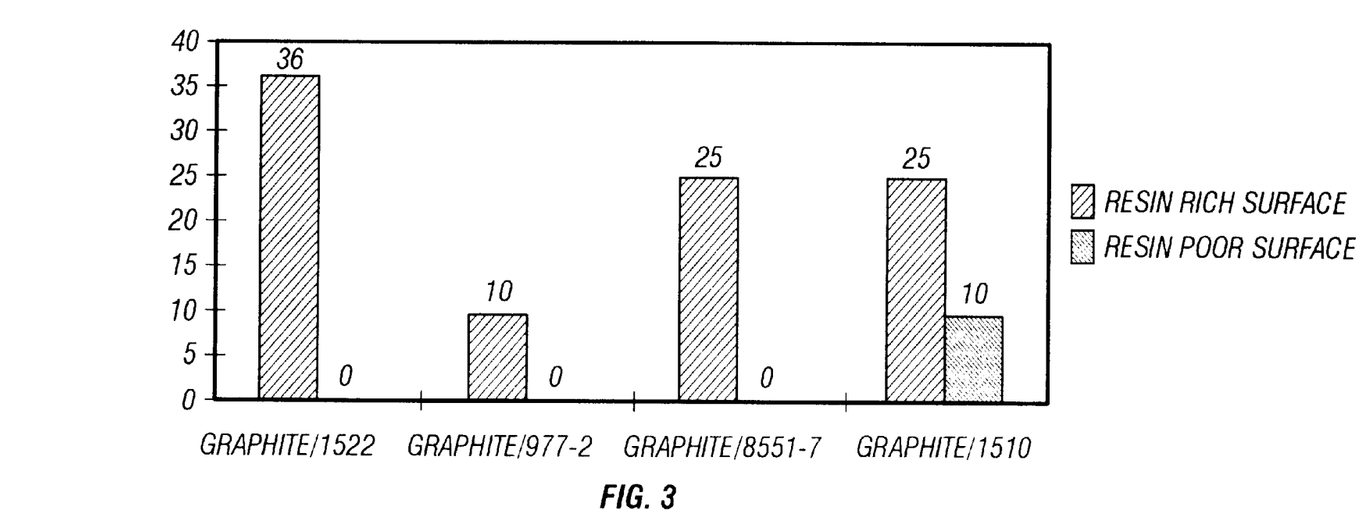
FIG. 3 is a graphical representation of graphite reinforced composite mechanical impact thresholds.

In the case of the 4 material examples in FIG. 3, the resin rich surface was processed with a smooth release film, in this case A4000 Teflon. This made a smooth glossy resin rich surface on the panels. The other panels, described as resin poor surface, were fabricated with a common peel ply at the laminate surfaces which results in a less resin rich and more textured surface.

This resin rich surface may also be achieved with other methods as listed below:

When fabricating with prepegs and male tooling, a layer of resin films placed on the tool prior to application of the prepreg. The resin may be cured simultaneously with the prepreg.

When fabricating with prepregs and male tooling, a layer of liquid resin coating is applied on the tool prior to application of the prepreg. The resin may be cured simultaneously with the prepreg.

A layer of liquid resin or resin film may be applied to the interior of a cured part wall. Next, this interior resin layer is cured.

Finally, both the resin and reinforcement may be different in one or more ways. For example, a Kevlar®, Nomex®, or glass reinforcement, in conjunction with a modified, more LOX-compatible resin system, could form the inner layer of the component. The primary component wall would consist of high structural performance graphite reinforced composite with a less LOX-compatible resin system.

A hybrid component may be processed by any of the following methods. First, the inner layer may be cocured with the primary component wall. Second, the inner layer may be cobonded to the primary component wall, or vice-versa. Finally, the inner layer may be secondarily bonded to the primary component wall.

B) Processing of Hybrid Components: Cocuring

A hybrid component would be best manufactured in a cocuring process, in which both the inner layer and primary component wall are cured simultaneously. First, the inner, more LOX-compatible composite system is applied to the tool (or mandrel). The inner composite layer can be made with either a prepreg or wet composite system. A prepreg consists of reinforcement, such as graphite, glass, or Kevlar®, which is impregnated with a resin. A wet process involves working with a neat resin and dry fiber reinforcement. Prepreg systems can be applied to the mandrel by any of the following processes: fiber placement, tape placement, filament winding, or hand lay-up. If the inner layer is a wet system, it may be applied to the tool using any of the following prcesses: filament winding, resin infiltration (RI) or vacuum-assisted resin transfer molding (VARTM).

After the inner layer is applied to the mandrel, the primary component wall is applied directly on top of the inner layer. If desired, an adhesive may be incorporated between the inner layers and the primary layers. This would be applied to the interior layer prior to applying the primary layer. Again, the primary component wall can be either a prepreg or wet system, and can be applied in any of the methods listed above.

Figure 4:
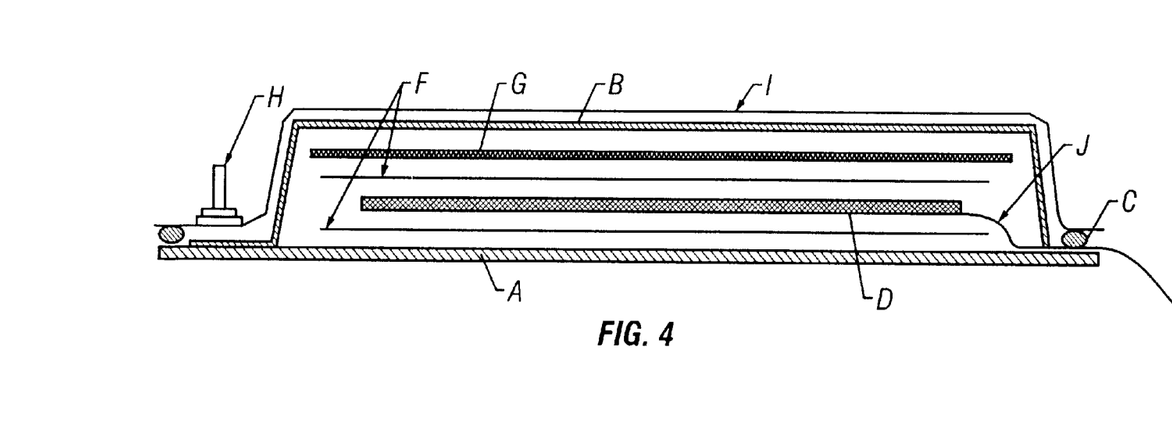
FIG. 4 is a schematic diagram of a hybrid prepreg autoclave vacuum bag.
Figure 5A:
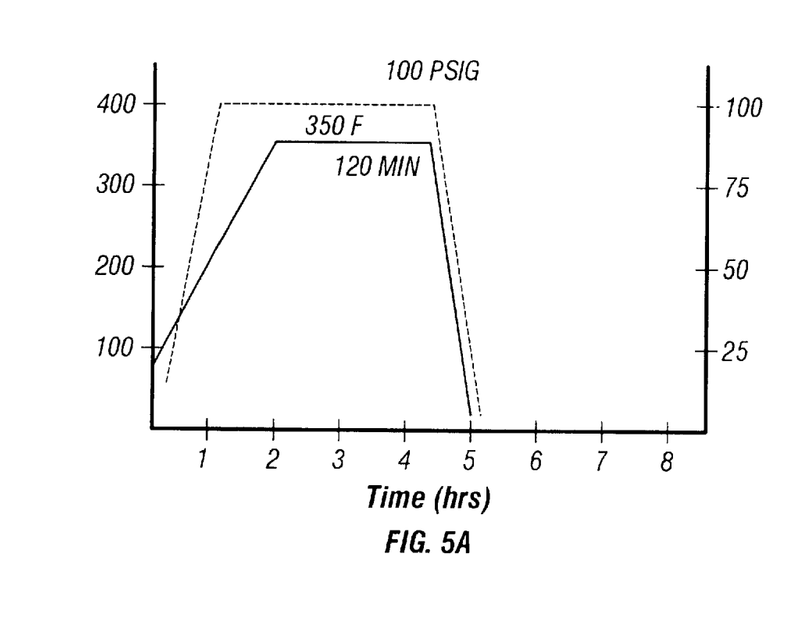
FIG. 5 is a graphical representation showing hybrid prepreg cure cycle.
Figure 5B:
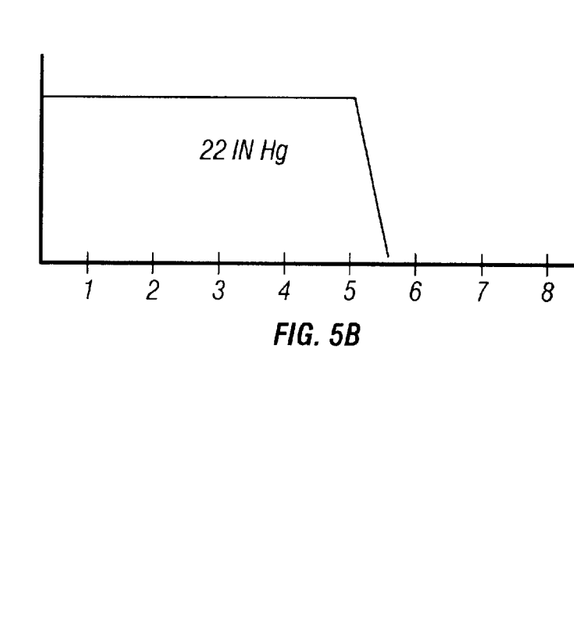

After the primary component wall is in place, both the inner layer and primary component wall are cured simultaneously. The cure method may be any of the following: autoclave (elevated temperature and pressure), vacuum-bag oven cure (elevated temperature and vacuum pressure), oven cure (elevated temperature, ambient pressure), or radiation cure (typically ambient temperature and pressure with radiation, such as electron beams or x-ray radiation). FIGS. 4 illustrates an example bagging sequence that may be used for either the autoclave or vacuum bag oven cure. FIG. 5 illustrates an example of an autoclave cure cycle for cocuring the inner and outer layers of a hybrid component wall.

C) Processing of Hybrid Components: Cobonding

A hybrid component can be cobonded in either of two ways. The first option is to cobond the primary wall to the cured interior wall. The second option would be to cobond the interior wall to a cured primary wall.

In the first method, either a wet composite system or a prepreg system is applied to the mandrel in any of the appropriate methods named in paragraph 1 of Section B. This skin is then cured using one of the processes listed in paragraph 3 of Section B. After the inner skin is cured, an adhesive is applied. The primary component wall material is then placed using an appropriate method for the system selected. The component is then cured, where both the adhesive and primary component wall are cured simultaneously to the previously cured inner skin. This procedure is more applicable to a large tank and not a typical feedline.

For tanks, the inverse of this process is also possible. That is, the primary system could be placed on a mandrel and cured in an appropriate ways. The mandrel could them be removed. Adhesive would be applied to the inside of the component, and the inner layer placed. Due to the geometric and mechanical complexities of automatically placing material inside of a "closed" component structure, any mechanized process (such as fiber or tape placement or filament winding) would be difficult if not impossible. A VARTM or RI process would also be difficult unless infused in sections. Therefore, manual lay-up of a prepreg or wet system would be the best method to choose. The component is then cured again, using any of the cure processes referenced in Section B, and the adhesive and interior layer are cured simultaneously into the cured primary structure.

D) Processing of Hybrid Components: Staging

A hybrid component can be manufactured in a staging process. This process is in-between the cocuring and cobonding processes above. The staging would be nearly identical to the cobonding processes described above. However, rather than completely curing one layer of the component (either the primary or interior wall) before placing the remaining layers, the first layer placed is merely staged. Staging is defined as applying energy, such as heat or radiation, to a composite system, until the chemical reaction (curing) starts, but stopping the reaction before the gel point is reached. Staging is often used to reduce resin flow to allow for easier subsequent processing. An adhesive may be used if desired, and then the other layer (either the primary or interior) is then placed onto the staged layer. Methods for placing both the interior and primary walls are those listed in paragraph 1 of Section B. The whole system is then cured using an appropriate method, where the first layer placed completes its cure process and the second layer placed (and the adhesive if used) cures entirely. Cure methods are listed in paragraph 3 of Section B.

E) Processing of Hybrid Components: Secondary Bonding

A hybrid component could be manufactured using a secondary bonding process. In this process, either a wet composite system or a prepreg system for the primary wall is applied to the mandrel in any of the appropriate methods named in Paragraph 1 of Section B. This skin is then cured using one of the processes listed above. The mandrel would then be removed. Adhesive is then applied to the interior of the primary component wall. Sheets of a previously cured yet flexible composite material are then placed manually onto the interior wall of the component, and the sheets are joined. Techniques for joining the sheets will vary depending on the interior layer resin system. Seaming methods include, but are not limited to, fusion with adjacent sheets (either with heat or electron beam source) or application of an adhesive and seaming strip over adjoining sheets. The component is then heated or subjected to radiation to cure the adhesive. This procedure is more applicable to a large tank and not a typical feedline.

The following listing describes parts shown in FIG. 4.

| | |
|---|---|
| A) BASE PLATE: | Aluminum, ⅜" thick with no deep scratches or pits. (If surface is damaged, a thin caul plate must be used to provide a smooth tool surface) |
| B) BREATHER: | Airtech Super 10 or Ultraweave 1032 |
| C) SEALANT TAPE: | Schnee-Moorehead 5626 or Airtech GS-213 |
| D) LAMINATE: | Interior and Primary Lay-up Specified Example (Interior: Kevlar/Resin A @ [45, |

-continued

|   |   |
|---|---|
| | −45]s; Primary: Graphite IM7/Resin B @ [0, 45, 90, −45]s). |
| F) RELEASE FILM: | Airtech, A4000R Release Film, (1 mil) |
| G) CAUL SHEET: | Torr, EL82, 50 DURO, 48" width, .063" Thk. |
| H) VACUUM COUPLING: | 2 required, 1 source & 1 transducer. Minimum of two plies of breather under couplings. |
| I) VACUUM BAG: | Airtech, DP1000 SHTG, 2 mil |
| J) THERMOCOUPLE: | 2 required, opposite edges of laminate, mid ply. |

1) Apply vacuum (22 in Hg min)   TIME (hrs)

2) Heat at 5° F./min to 350° F. Lagging T/C must maintain 3° F./min minimum.
4) Apply 100 psi pressure to laminate.
7) Hold at 350° F. (−5/+10° F.) for 120 minutes.
8) Cool at −5° F./min.
9) Maintain pressure until the temperature falls below 150° F.

NOTES: This cure cycle may be modified as follows:
1. Additional holds may be specified by manufacturing engineering (ME) if the lagging thermocouple falls 15° F. behind leading thermocouple. Intermediate holds are to be implemented to allow lagging thermocouples to reach within 5° F. of leading. The intermediate holds for the leading thermocouple should be limited to 180° F., 225° F. and/or 315° F..
2) ME may specify hot and/or cold debulks to ensure good ply consolidation or to protect the part between shifts.
3) ME may specify a maximum of 10 psi at the beginning of the cure cycle to improve heat transfer in the autoclave.
4) ME may specify alternative peel plies to promote adhesion in future bond areas that may require additional strength.

PARTS LIST

10 tank apparatus
11 cylindrical sidewall
12 frusto-conical end
13 frusto-conical end
14 lobe
15 lobe
16 support beam
17 support beam
18 support beam
19 support beam
20 support beam
21 support beam
22 support beam
23 support beam
24 spherical tank
25 ogived tank
26 lifting body
27 winged body
28 cylindrical stage
29 multi-lobe tank
30 conformed tank The following is a list of parts and materials suitable for use in the present invention:

| Material | Generic Description | Trademark | Supplier |
|---|---|---|---|
| primary fiber or interior fiber (but not both, unless resins are different) | intermediate modulus, high strength graphite, which may be uni-directional tape, slit tape, tow, fabric, woven fabric, chopped fiber, or felt | Examples: IM7, IM6, IM2; Note: Preferred is IM7 | Hexcel |
| primary fiber or interior fiber (but not both unless resins are different) | intermediate modulus, high strength graphite, which may be uni-directional tape, slit tape, tow, fabric, woven fabric, chopped fiber, or felt | Examples: T650, T800, T300 | Amoco |
| primary fiber or interior fiber (but not both unless resins are different) | high modulus, intermediate strength graphite intermediate modulus, high strength graphite, which may be uni-directional tape, slit tape, tow, fabric, woven fabric, chopped fiber, or felt | Example: M55J | Hexcel |
| primary fiber or interior fiber (but not both unless resins are different) | glass (E, S, or C type) | Fiberglas ® | Owens/Corning |
| primary fiber or interior fiber (but not both unless resins are different) | Aramid | Kevlar ® | Hexcel |
| primary resin or interior resin (but not both unless fibers are different) | cyanate ester | 954-2A, 954-3 Note these are typically supplied in as prepregs with reinforcment | Hexcel (formerly available from Fiberite) |
| primary resin or interior resin (but not both unless fibers are different) | cyanate ester | 1510 Note this has typically been supplied as a wet resin (as opposed to a prepreg); however, the inventors have had Bryte specifically tailor the 1510 resin and supply it as a prepreg form. | Bryte |
| primary resin or interior resin (but not both unless fibers are different) | cyanate ester | 1545 Note this has typically been supplied as a wet resin | Bryte |
| primary resin or interior resin (but not both unless fibers are different) | cyanate ester | 1522, 1522-1 Note: these are both supplied as prepregs; the 1522-1 may also be supplied as resin only; the 1522 family is a blend of epoxy-cyanate ester-bromine | Bryte |
| primary resin or interior resin (but not both unless fibers are different) | halogenated epoxy | F155 resin (in which the halogen is Bromine) | Hexcel |
| primary resin or interior resin (but not both unless fibers are different) | halogenated cyanate ester | EX 1522-1 (in which the halogen is Bromine) | Bryte |
| primary resin or interior resin (but not both unless | halogenated thermoplastic (may be considered a | Avimid N (in which case the halogen is | Fiberite (formerly from |

-continued

| Material | Generic Description | Trademark | Supplier |
|---|---|---|---|
| fibers are different) | pseudothermosetting one) | Fluorine); this material is supplied as a prepreg | DuPont) |
| primary resin or interior resin (but not both unless fibers are different) | halogenated epoxy, wet resin | Examples: EPON 1162, 1183 (both of these have Bromine as a halogen) | Shell |
| primary resin or interior resin (but not both unless fibers are different) | thermoplastically toughened epoxies | 977 resins; most preferred is 977-6 | Hexcel or Cytec Fiberite |
| primary resin or interior resin (but not both unless fibers are different) | polyimide (a pseudo-thermosetting type) | Avimid R1–16 | Cytec-Fiberite (formerly Dupont) |
| primary resin or interior resin (but not both unless fibers are different) | polyimide | Avimid N | Cytec-Fiberite (formerly Dupont) |
| primary resin or interior resin (but not both unless fibers are different) | polyimide | PIXA | Cytec-Fiberite (formerly Dupont) |
| primary resin or interior resin (but not both unless fibers are different) | polyimide | Avimid K3B | Cytec-Fiberite (formerly Dupont) |
| primary resin or interior resin (but not both unless fibers are different) | polyimide | Avimid NR150 | Cytec-Fiberite (formerly Dupont) |
| primary resin or interior resin (but not both unless fibers are different) | polyimide (a pseudo-thermosetting type) | Avimid R | Cytec-Fiberite (formerly Dupont) |
| resin-rich interior surface (fiber-IM7, resin-epoxy such as 977-6 or cyanate ester/bromine/epoxy blend 1522) | | | |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

What is claimed is:

1. A liquid oxygen tank apparatus comprising:
   a) a tank body having a wall with inner and outer surfaces, the inner surface defining a hollow interior for containing liquid oxygen;
   b) the tank wall comprising a hybrid composite construction that includes a first wall portion and a second wall portion, the first wall portion including a first resin with a first fiber and the second wall portion including said inner surface and including a liquid oxygen compatible resin that is fiber reinforced.

2. The liquid oxygen tank apparatus of claim 1 wherein the mechanical impact threshold is at least 10 foot pounds.

3. The liquid oxygen tank apparatus of claim 1 wherein the mechanical impact threshold is at least 25 foot pounds.

4. The liquid oxygen tank apparatus of claim 1 wherein the mechanical impact threshold is at least 36 foot pounds.

5. The liquid oxygen tank apparatus of claim 1 wherein the mechanical impact threshold is at least 72 foot pounds.

6. A method of using a composite tank to hold liquid oxygen, comprising:

providing a composite tank apparatus, the composite tank apparatus comprising a structural tank body having means for containing liquid oxygen, the tank body having an interior for containing a cryogenic material that has a temperature as low as around minus 300 degrees F., the tank body having a tank wall with an inner surface for contacting liquid oxygen, the tank wall including said inner surface having a hybrid composite construction that includes a fiber-reinforced resin portion; and putting liquid oxygen in the composite tank apparatus; and wherein the tank has a primary component wall system and an interior component wall system, the primary component wall system being made of a first resin reinforced with a first fiber, and the interior component wall system including more liquid oxygen compatible material.

7. Apparatus for holding liquid oxygen comprising:
   a structural tank body having means for containing liquid oxygen, the tank body having an interior for containing a cryogenic material that has a temperature as low as around minus 300 degrees F., the tank body having a tank wall with an inner surface for contacting liquid oxygen, the tank wall and inner surface each having a hybrid composite construction, wherein the tank has a primary component wall system and an interior component wall system, the primary component wall system being made of a first resin reinforced with a first fiber, and the interior component wall system including a more liquid oxygen compatible fiber or a more liquid oxygen compatible resin; and
   wherein the fiber-reinforced resin portion directly contacts liquid oxygen when liquid oxygen is put into the composite tank apparatus.

8. Apparatus for transporting liquid oxygen comprising:
   a composite feedline having means for transporting liquid oxygen, the feedline having an interior for transporting a cryogenic material that has a temperature as low as around minus 300 degrees F., the feedline having a feedline wall with an inner surface for contacting liquid oxygen, the feedline wall and inner surface having a hybrid composite construction that includes a fiber-reinforced resin portion, wherein the feedline has a primary component wall system and an interior component wall system, the primary component wall system being made of a first resin reinforced with a first fiber, and the interior component wall system including a more liquid oxygen compatible fiber or a more liquid oxygen compatible resin; and
   wherein the inner surface directly contacts liquid oxygen when liquid oxygen is put into the feedline.

9. A launch vehicle comprising:
   a) an air frame;
   b) an engine;
   c) liquid oxygen for fueling the engine;
   d) a tank for containing said liquid oxygen, the tank comprising:

i) a tank body having a wall with inner and outer surfaces, the inner surface defining a hollow interior for containing liquid oxygen;

ii) the tank wall comprising a hybrid composite construction that includes first and second wall portions, the first wall portion including a first resin with a first fiber and the second wall portion including said inner surface and a liquid oxygen compatible resin.

10. The launch vehicle of claim 9 wherein the tank is spherical in shape.

11. The launch vehicle of claim 9 wherein the tank is a multi-lobe tank.

12. The launch vehicle of claim 9 wherein the tank is conformal in shape.

13. A liquid oxygen tank apparatus comprising:

a) a linerless tank body having a wall with inner and outer surfaces, the inner surface defining a hollow interior for containing liquid oxygen;

b) the tank wall comprising a hybrid composite construction that includes first and second wall portion, the first wall portion including a first resin with a first fiber and the second wall portion including a liquid oxygen compatible resin.

14. The liquid oxygen tank apparatus of claim 13 wherein the mechanical impact threshold is at least 10 foot pounds.

15. The liquid oxygen tank apparatus of claim 13 wherein the mechanical impact threshold is at least 25 foot pounds.

16. The liquid oxygen tank apparatus of claim 13 wherein the mechanical impact threshold is at least 36 foot pounds.

17. The liquid oxygen tank apparatus of claim 13 wherein the mechanical impact threshold is at least 72 foot pounds.

18. A method of using a composite tank to hold liquid oxygen, comprising:

a) providing a composite tank apparatus, the composite tank apparatus comprising a linerless structural tank body having means for containing liquid oxygen, the tank body having an interior for containing a cryogenic material that has a temperature as low as around minus 300 degrees F., the tank body having a tank wall with an inner surface for contacting liquid oxygen, the tank wall having a hybrid composite construction that includes a fiber-reinforced resin portion; and putting liquid oxygen in the composite tank apparatus.

19. Apparatus for transporting liquid oxygen comprising:

a linerless composite feedline having means for transporting liquid oxygen, the feedline having an interior for transporting a cryogenic material that has a temperature as low as around minus 300 degrees F., the feedline having a feedline wall with an inner surface for contacting liquid oxygen, the feedline wall having a hybrid composite construction that includes a fiber-reinforced resin portion, wherein the feedline has a outer primary component wall system and an interior component wall system, the primary component wall system being made of a first resin reinforced with a first fiber, and the interior component wall system including more liquid oxygen compatible fiber or a more liquid oxygen compatible resin.

20. Apparatus for holding liquid oxygen comprising:

a linerless structural tank body having means for containing the tank body having an interior for containing a cryogenic material that has a temperature as low as around minus 300 degrees F., the tank body having a tank wall with an inner surface for contacting liquid oxygen, the tank wall having a hybrid composite construction that includes a fiber-reinforced resin portion, wherein the tank has an outer, primary component wall system and an interior component wall system, the primary component wall system being made of a first resin reinforced with a first fiber, and the interior component wall system including a more liquid oxygen compatible fiber or a more liquid oxygen compatible resin.

21. The apparatus of claim 20 wherein the interior component wall system includes a more compatible fiber material.

22. The apparatus of claim 20 wherein the interior component wall system includes a more liquid oxygen compatible form of fiber.

23. The apparatus of claim 20 wherein the interior component wall system includes a more liquid oxygen compatible resin.

24. The apparatus of claim 20 wherein the interior component wall system includes a more liquid oxygen compatible lay-up pattern.

25. The apparatus of claim 20 wherein the interior component wall system includes a more liquid oxygen compatible treatment of the resin.

26. The apparatus of claim 20 wherein the interior component wall system includes a more liquid oxygen compatible resin rich inner surface.

27. A launch vehicle comprising:

a) an air frame;

b) an engine;

c) liquid oxygen for fueling the engine;

d) a tank for containing said liquid oxygen, the tank comprising:

i) a tank body having a wall with inner and outer surfaces, the inner surface defining a hollow interior for containing liquid oxygen;

ii) the tank wall comprising a hybrid composite construction that includes first and second wall portion, the first wall portion including a first resin with a first fiber and the second wall portion being more liquid oxygen compatible than the first wall portion.

28. The liquid oxygen tank apparatus of claim 27 wherein the mechanical impact threshold is at least 10 foot pounds.

29. The liquid oxygen tank apparatus of claim 27 wherein the mechanical impact threshold is at least 19 foot pounds.

30. The liquid oxygen tank apparatus of claim 27 wherein the mechanical impact threshold is at least 36 foot pounds.

31. The launch vehicle of claim 27 wherein the tank is conformal in shape.

32. The launch vehicle of claim 27 wherein the tank is spherical in shape.

33. The launch vehicle of claim 27 wherein the tank is a multi-lobe tank.

* * * * *